US008925937B2

(12) United States Patent
Wu (10) Patent No.: US 8,925,937 B2
(45) Date of Patent: Jan. 6, 2015

(54) TODDLER WALKER

(71) Applicant: Taiwan Jodani Industrial Co., Ltd., Kaohsiung (TW)

(72) Inventor: Tung-Chiao Wu, Kaohsiung (TW)

(73) Assignee: Taiwan Jodani Industrial Co., Ltd., Kaohsiung (TW)

( * ) Notice: Subject to any disclaimer, the term of this patent is extended or adjusted under 35 U.S.C. 154(b) by 0 days.

(21) Appl. No.: 13/711,696

(22) Filed: Dec. 12, 2012

(65) Prior Publication Data
US 2014/0159331 A1 Jun. 12, 2014

(51) Int. Cl.
*B62B 7/04* (2006.01)
*A47D 13/04* (2006.01)

(52) U.S. Cl.
CPC ..................................... *A47D 13/04* (2013.01)
USPC ..................... 280/87.051; 280/28.5; 446/440; 446/468

(58) Field of Classification Search
USPC ................. 280/87.051, 87.01, 87.021, 28.5; 446/440, 468
See application file for complete search history.

(56) References Cited

U.S. PATENT DOCUMENTS

| | | | | |
|---|---|---|---|---|
| 3,751,851 A * | 8/1973 | Nagai | | 446/440 |
| 5,441,289 A * | 8/1995 | Spielberger | | 280/87.051 |
| 5,788,253 A * | 8/1998 | Thomson et al. | | 280/87.041 |
| 6,089,586 A * | 7/2000 | Rudell et al. | | 280/282 |
| 6,206,384 B1 * | 3/2001 | Chi et al. | | 280/30 |
| 6,296,268 B1 * | 10/2001 | Ford et al. | | 280/648 |
| 6,408,967 B1 * | 6/2002 | Huntsberger et al. | | 180/65.1 |
| 6,641,456 B2 * | 11/2003 | Wang | | 446/440 |
| 6,656,010 B1 * | 12/2003 | Bienz et al. | | 446/431 |
| 6,695,327 B1 * | 2/2004 | Maggiore et al. | | 280/87.051 |
| 6,722,674 B2 * | 4/2004 | Gu et al. | | 280/87.021 |
| 6,860,497 B2 * | 3/2005 | Wang | | 280/87.021 |
| 6,863,287 B2 * | 3/2005 | Myers et al. | | 280/87.051 |
| 6,994,179 B2 * | 2/2006 | Huntsberger et al. | | 180/65.22 |
| 7,021,638 B2 * | 4/2006 | Wang | | 280/87.021 |
| 7,455,308 B2 * | 11/2008 | Michelau et al. | | 280/282 |
| 7,530,411 B2 * | 5/2009 | Huntsberger et al. | | 180/65.1 |
| 8,517,403 B2 * | 8/2013 | Jessie, Jr. | | 280/87.041 |
| 2003/0132592 A1 * | 7/2003 | Dombroski | | 280/87.01 |
| 2003/0184036 A1 | 10/2003 | Wu | | |

FOREIGN PATENT DOCUMENTS

TW M397932 U 2/2011

* cited by examiner

*Primary Examiner* — Jeffrey J Restifo
(74) *Attorney, Agent, or Firm* — Alan Kamrath; Kamrath IP Lawfirm, P.A.

(57) ABSTRACT

A toddler walker includes a body and at least one wheel. The at least one wheel is coupled with and arranged under the body. Each wheel includes first and second wheel frames. Each wheel frame includes an annular portion and an inner edge forming a central hole. The inner edge is positioned at one side of the annular portion. Each wheel frame further includes an extension portion extending from the inner edge to the annular portion, as well as a plurality of connection posts. The extension portions of the wheel frames face each other. The wheel frames are fastened together to jointly form a wheel-receiving space. A rolling wheel and a plurality of rolling members are received in the wheel-receiving space. The rolling members are rotatably coupled with the connection posts of the wheel frames and abut against an inner circumferential face of the rolling wheel.

4 Claims, 6 Drawing Sheets

TODDLER WALKER

BACKGROUND OF THE INVENTION

1. Field of the Invention

The present invention generally relates to an apparatus designed for toddlers and, more particularly, to a toddler walker that provides assistance to the toddlers when learning to walk.

2. Description of the Related Art

Figure 1:
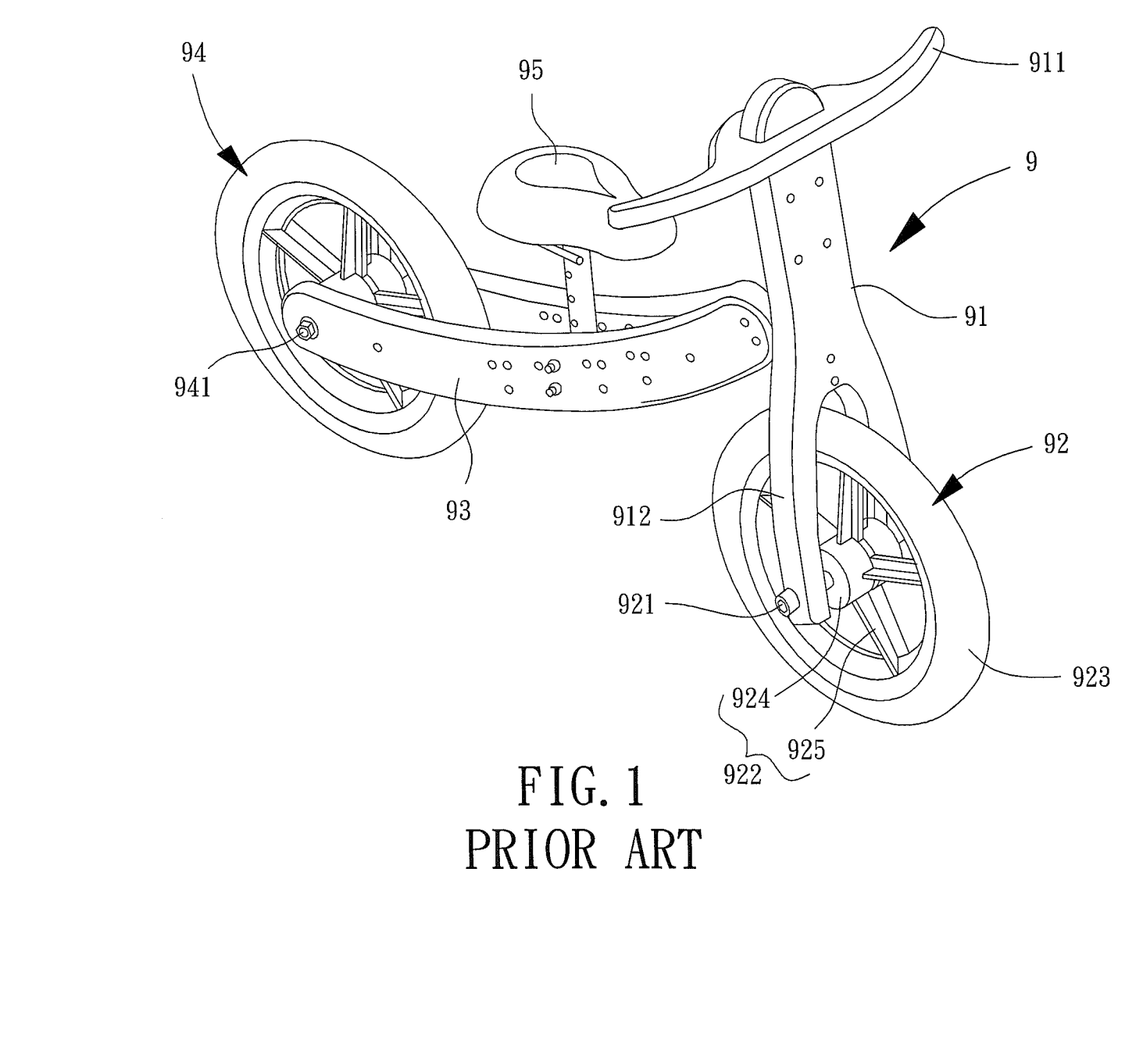
FIG. 1 shows a conventional toddler walker.

FIG. 1 shows a toddler walker 9 disclosed in Taiwan Patent No. M397932. The toddler walker 9 includes a fork 91, a front wheel 92, two lateral arcuate boards 93, a rear wheel 94 and a seat 95. A handlebar 911 is arranged at one end of the fork 91 to provide the user with a safe grip placement for their hands when riding the toddler walker 9. The fork 91 includes two arms 912. The toddler walker 9 further includes two shafts 921 and 941. The front wheel 92 is rotatably coupled between the two arms 912 via the shaft 921. Each lateral arcuate board 93 includes a front end coupled with one face of the fork 91. The rear wheel 94 is rotatably coupled between rear ends of the two lateral arcuate boards 93 via the shaft 941. The seat 95 is located above the lateral arcuate boards 93 and arranged in approximately the center position of the entire length of the lateral arcuate boards 93. A toddler can sit on the seat 95, grip the handlebar 911 and position his/her feet on the ground. Based on this, the toddler can propel the front wheel 92 and the rear wheel 94 in a forward or backward direction by using a "walking motion". The toddler walker 9 will start to move under the rotation of the front wheel 92 and the rear wheel 94.

However, the front wheel 92 or the rear wheel 94 may get stuck by foreign debris, such as a toy, a twig, a limb etc, due to the large space between each spoke. This causes the toddler walker 9 and the toddler to fall over from a sudden stop in momentum and results in an injury to the toddler. As an example of the front wheel 92, the front wheel 92 includes a wheel frame 922 and a tire 923 fitted around an outer periphery of the wheel frame 922. A hub 924 is arranged at a center of the wheel frame 922. A plurality of spokes 925 extends outwards from an outer peripheral face of the hub 924. The shaft 921 extends through the hub 924 to rotatably couple the front wheel 92 to the fork 91. In this structure, as stated above, the front wheel 92 will get stuck by foreign debris and stop rotating immediately when the foreign debris get stuck between the spokes 925, leading to the collapse of the toddler walker 9. Thus, the safety of the toddler walker 9 is inadequate.

In light of this, it is necessary to improve the conventional toddler walker 9.

SUMMARY OF THE INVENTION

It is therefore the objective of this invention to provide a toddler walker comprising a wheel or wheels, with each wheel having a central bore to prevent the wheel or wheels from stopping rotating when stuck by foreign debris.

In an embodiment, a toddler walker is disclosed. The toddler walker comprises a body and at least one wheel. The at least one wheel is coupled with and arranged under the body. Each of the at least one wheel comprises first and second wheel frames. Each of the first and second wheel frames comprises an annular portion and an inner edge forming a central hole. The inner edge is positioned at one side of the annular portion. Each of the first and second wheel frames further comprises an extension portion extending from the inner edge to the annular portion, as well as a plurality of connection posts annularly arranged around the extension portion. The extension portions of the first and second wheel frames face each other. The first and second wheel frames are fastened together to jointly form a wheel-receiving space. A rolling wheel and a plurality of rolling members are received in the wheel-receiving space. The rolling members are rotatably coupled with the connection posts of the first and second wheel frames and abut against an inner circumferential face of the rolling wheel.

In a preferred form shown, the rolling wheel comprises a wheel frame having a through-hole. The extension portions of the first and second wheel frames are received in the through-hole. The wheel frame further comprises a limiting portion. The rolling members rotatably abut with the limiting portion and the inner circumferential face of the rolling wheel.

In the preferred form shown, the limiting portion is in the form of an annular protrusion located on a center section of the inner circumferential face of the rolling wheel. Each of the rolling members comprises a shaft having first and second ends. A first abutting portion is arranged at the first end of the shaft, and a second abutting portion is arranged at the second end of the shaft. The first abutting portion comprises an inner end relatively close to the second abutting portion, as well as an outer end relatively distant to the second abutting portion. A coupling portion is arranged at the outer end of the first abutting portion and is connected to a corresponding one of the connection posts of the first wheel frame. The second abutting portion comprises an inner end relatively close to the first abutting portion, as well as an outer end relatively distant to the first abutting portion. Another coupling portion is arranged at the outer end of the second abutting portion and is connected to a corresponding one of the connection posts of the second wheel frame. The two coupling portions abut against the inner circumferential face of the rolling wheel, and the limiting portion of the wheel frame is limited in a position between the two abutting portions.

In the preferred form shown, the toddler walker further comprises a vibration reduction pad covered around an outer peripheral face of the middle frame.

In the preferred form shown, each of the first and second wheel frames comprises a connection portion coupled with an outer periphery of the annular portion. The connection portion is positioned at one side of the annular portion and extends to the annular portion in a direction parallel to an extension direction of the extension portion. The first and second wheel frames are fastened together via the connection portions of the first and second wheel frames.

In the preferred form shown, two of the connection posts of each of the first and second wheel frames are arranged below the extension portion.

In the preferred form shown, the rest of the connection posts of each of the first and second wheel frames is arranged with the two of the connection posts in a same included angle around the extension portion.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 2:
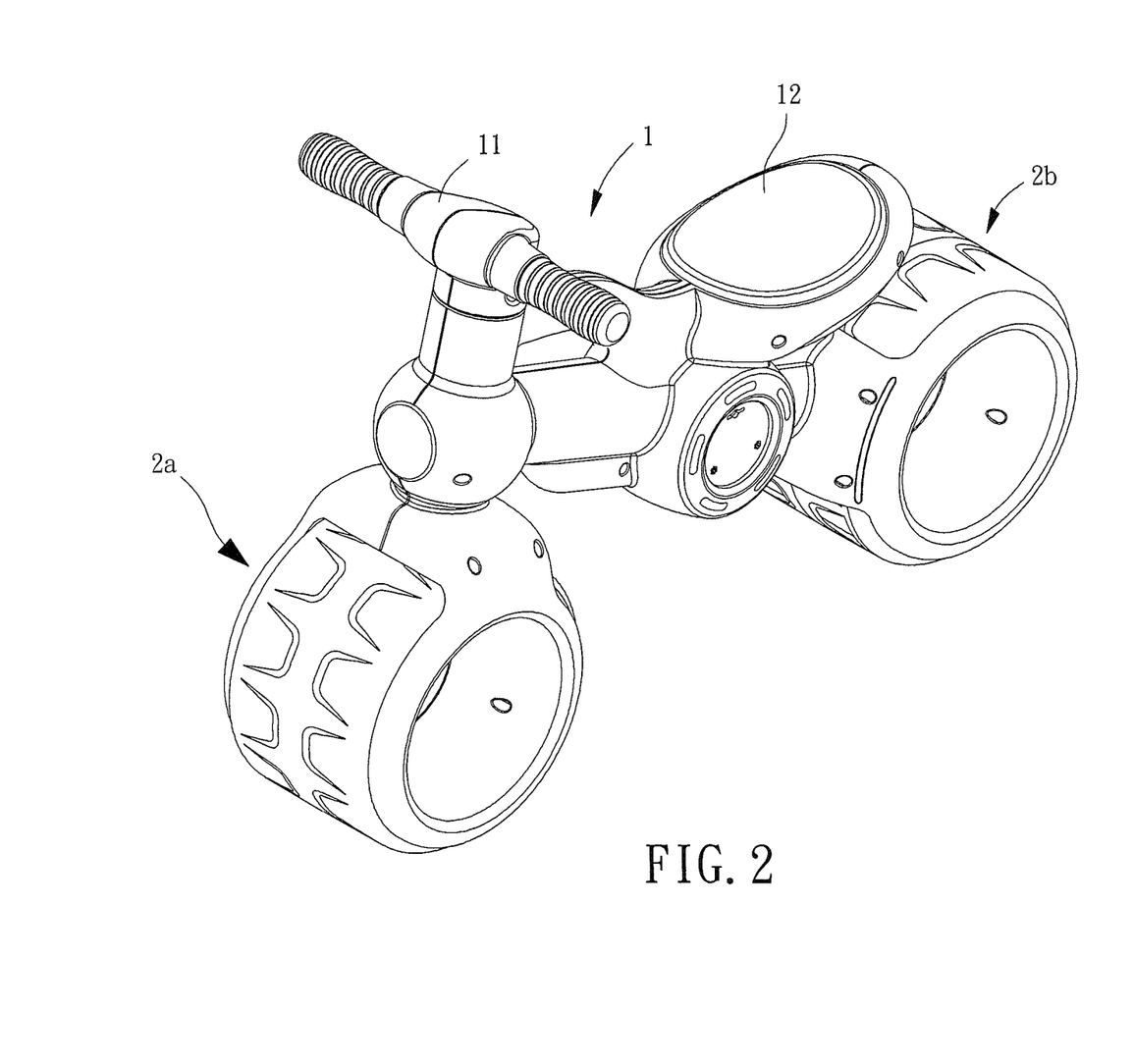
FIG. 2 shows a toddler walker according to a preferred embodiment of the invention.

Referring to FIG. 2, a toddler walker is disclosed according to a preferred embodiment of the invention. In this embodiment, the toddler walker may include a body 1 and at least one wheel 2. The wheel 2 is affixed to and arranged under the body 1 to propel the body 1 in a desired direction.

It is noted that the wheel 2 is a hubless wheel design having a central bore (which will be described later) and, therefore, there may be one or more wheels 2 without any limitation. The toddler walker may be in the form of a monocycle, a bicycle or a tricycle based on the quantity of the wheel 2 or wheels 2, as it can be readily appreciated by one skilled in the art. In this embodiment, the toddler walker is implemented with, but not limited to, a bicycle.

Referring to FIG. 2, the toddler walker includes two wheels, namely, a front wheel 2a and a rear wheel 2b.

The body 1 has a long shape and is transversely disposed. The body 1 includes a front part and a rear part. A handlebar 11 is affixed to a top of the front part of the body 1. The front wheel 2a is affixed to a bottom of the front part of the body 1. The body 1 further includes a seat portion 12 arranged at a top of the rear part of the body 1. A user may sit on the seat portion 12 and grip the handlebar 11 while walking to propel the toddler walker in the desired direction.

Figure 3:
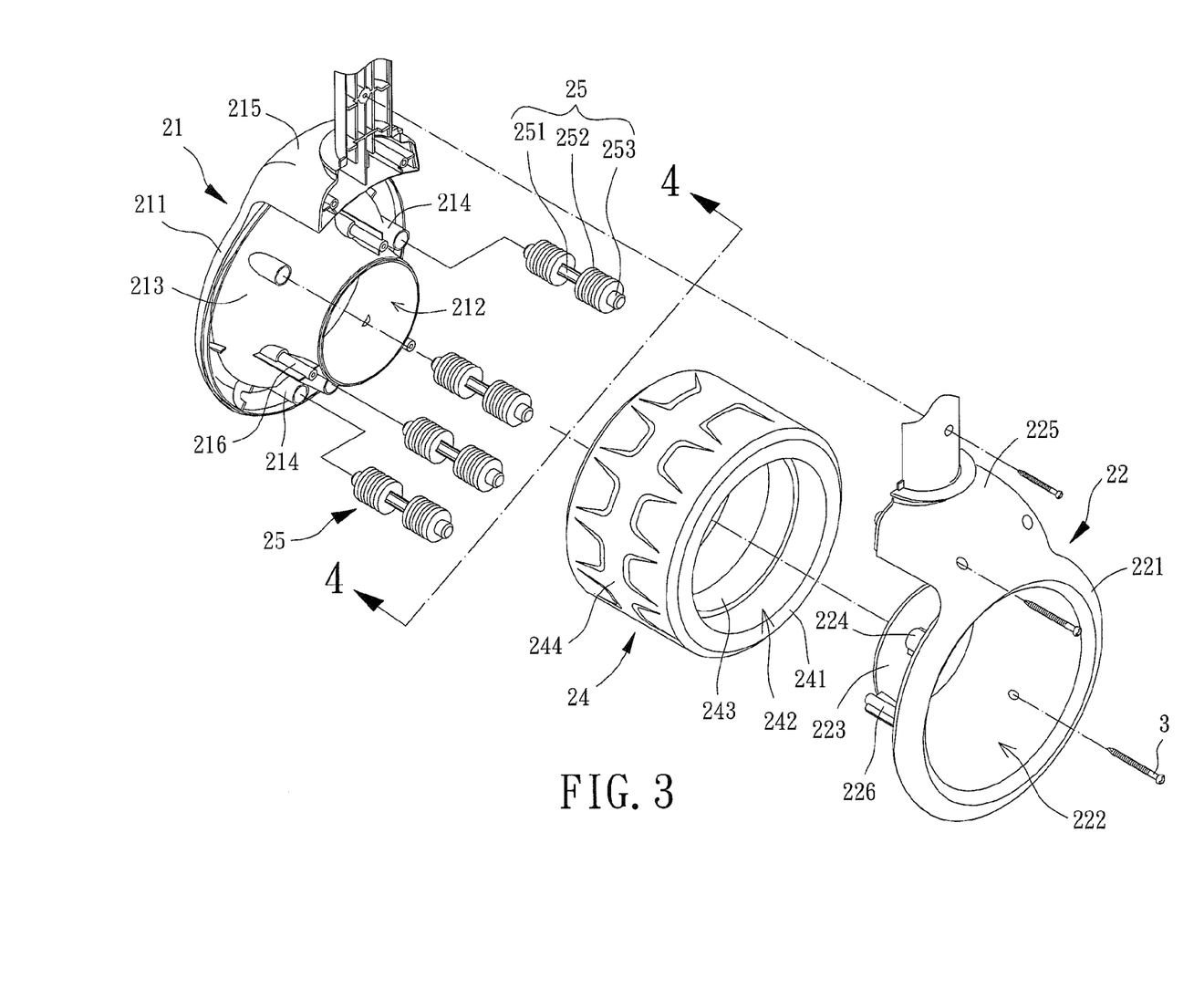
FIG. 3 is an exploded view of a front wheel of the toddler walker according to the preferred embodiment of the invention.
Figure 5:
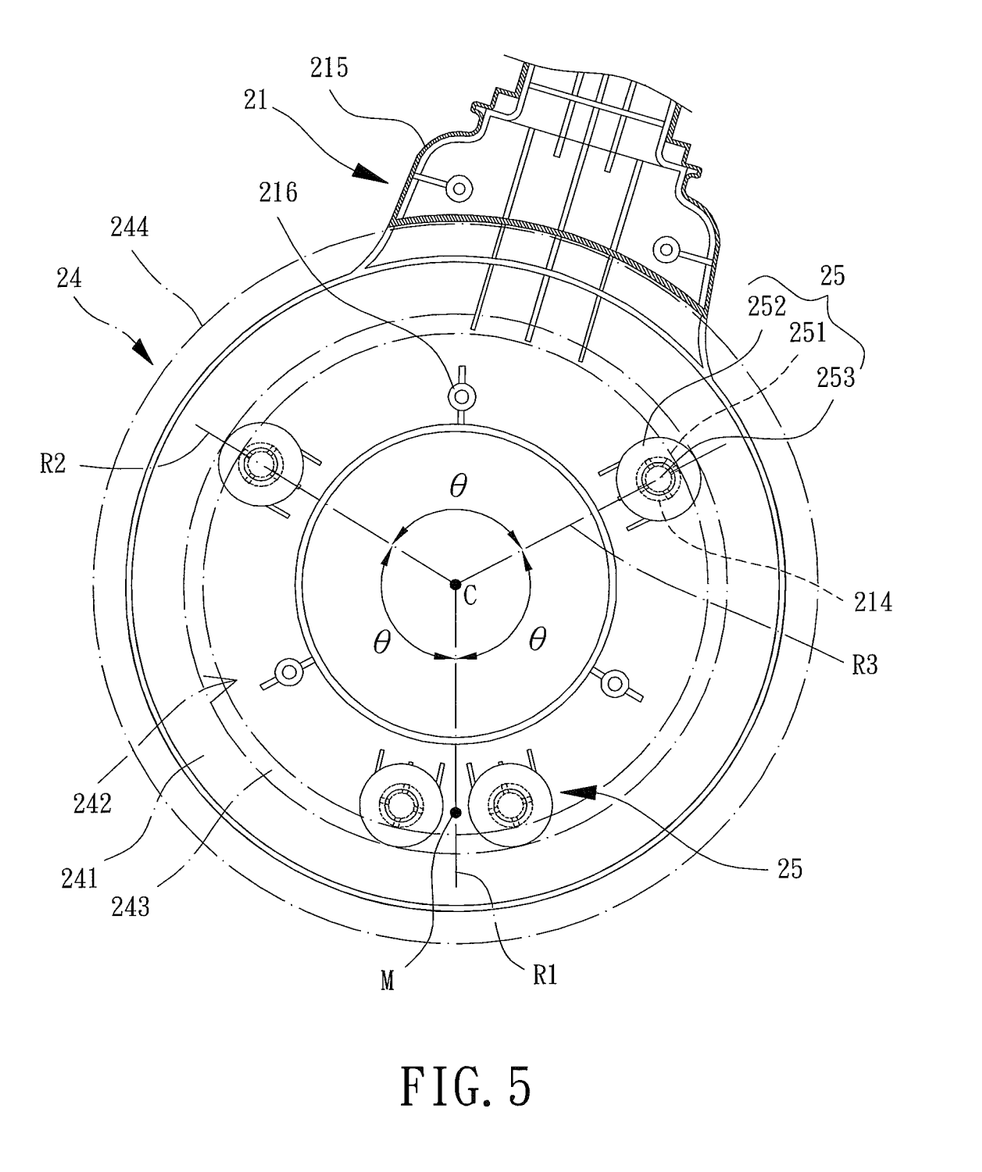
FIG. 5 is the cross-sectional view in FIG. 4 showing that the rolling members of the front wheel are annularly arranged in substantially the same included angle.
Figure 6:
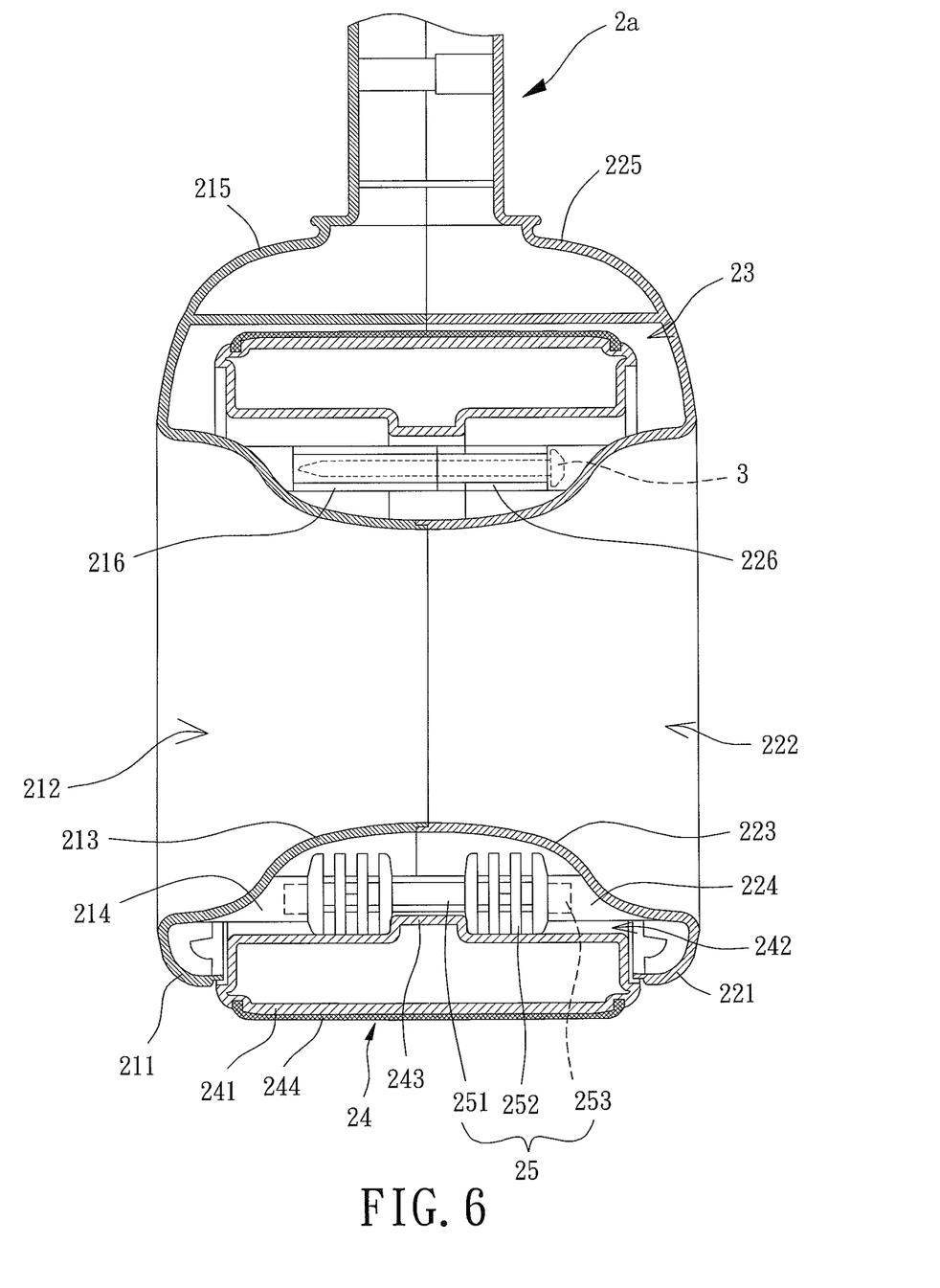
FIG. 6 is a cross-sectional view of the front wheel taken along line 6-6 in FIG. 4.

Referring to FIGS. 3 and 5 also, the front wheel 2a includes a first wheel frame 21 and a second wheel frame 22. The first wheel frame 21 and the second wheel frame 22 may be fastened together to jointly form a wheel-receiving space 23. A rolling wheel 24 is installed in the wheel-receiving space 23. When the rolling wheel 24 is firmly fastened by a plurality of rolling members 25, the rolling wheel 24 is able to rotate relatively to the first wheel frame 21 and the second wheel frame 22 under the rotation of the rolling members 25.

Figure 4:
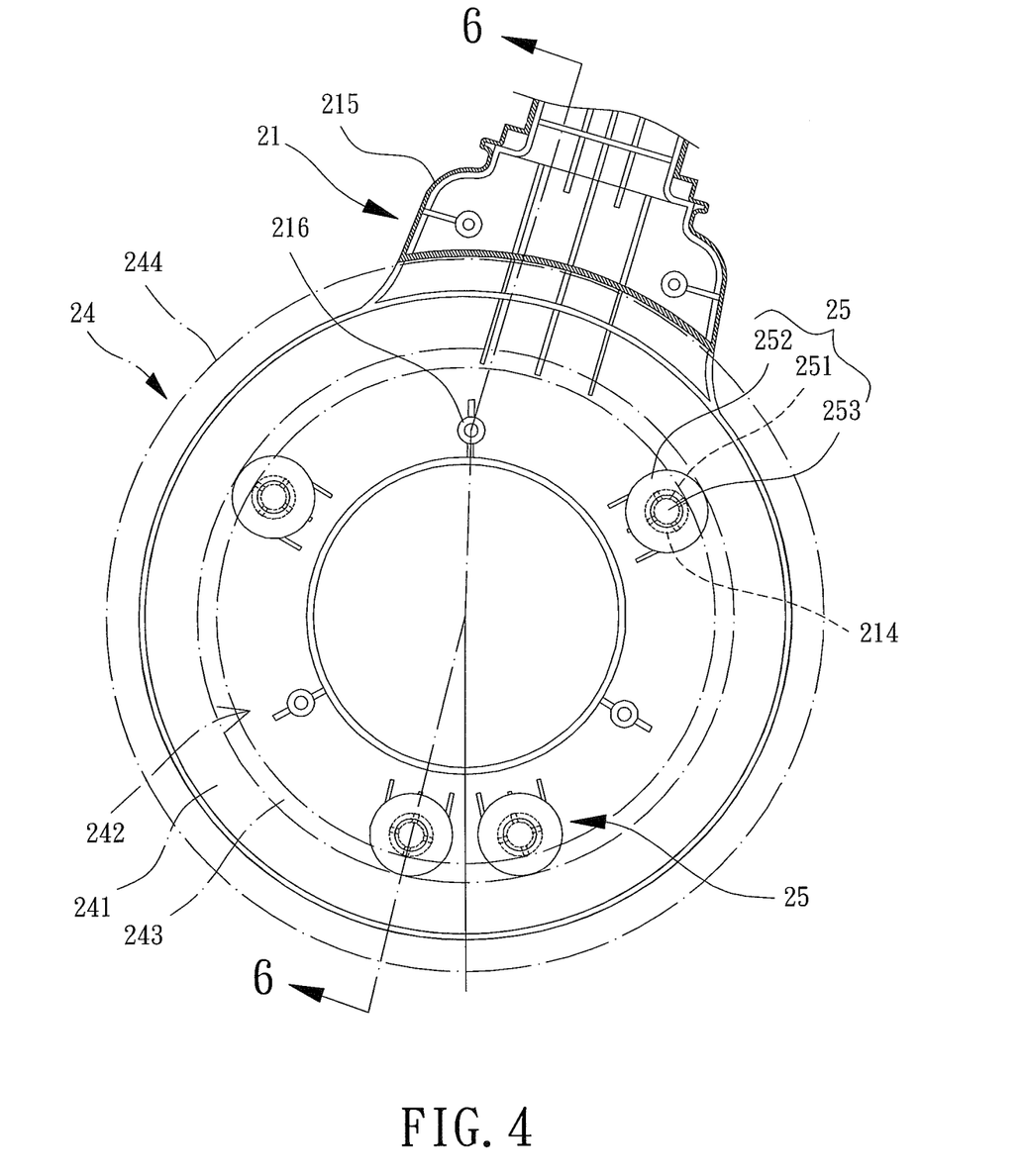
FIG. 4 is a cross-sectional view of the front wheel taken along line 4-4 in FIG. 3.

Specifically, referring to FIG. 3, the first wheel frame 21 includes an annular portion 211 and an inner edge forming a central hole 212. The inner edge of the first wheel frame 21 is positioned at one side of the annular portion 211. The first wheel frame 21 further includes an extension portion 213 extending from the inner edge of the first wheel frame 21 to the annular portion 211 in a direction perpendicular to the annular portion 211. The extension portion 213 is in the form of a cylinder. The first wheel frame 21 further includes a plurality of connection posts 214 annularly arranged around the extension portion 213. Specifically, as shown in FIG. 4, two of the connection posts 214 are preferably arranged below the extension portion 213. Based on this, all of the connection posts 214 are annularly arranged around the extension portion 213 in substantially the same included angle. Specifically, referring to FIG. 5, a first reference line R1 is defined to extend from a center C of the first wheel frame 21 through a center point M between the two connection posts 214 below the extension portion 213. The center point M is spaced from either connection post 214 below the extension portion 213 by substantially the same distance. A second reference line R2 and a third reference line R3 also extend outwards from the center C of the first wheel frame 21 in separate directions. The first, second and third reference lines R1, R2 and R3 are spaced from each other by substantially the same included angle θ as shown in FIG. 5. In this regard, the other two connection posts 214 are arranged on the second reference line R2 and the third reference line R3.

The first wheel frame 21 further includes a connection portion 215 that can be coupled with an outer periphery of the annular portion 211. The connection portion 215 is positioned at one side of the annular portion 211 and extends to the annular portion 211 in a direction parallel to the extension direction of the extension portion 213. The first wheel frame 21 further includes a plurality of fixing portions 216 that can be screwed by a plurality of screwing members 3; such as screws.

The first wheel frame 21 is substantially of mirror symmetry of the second wheel frame 22. In other words, the first wheel frame 21 and the second wheel frame 22 have substantially the same structures. Specifically, the second wheel frame 22 includes an annular portion 221 and an inner edge forming a central hole 222. The inner edge of the second wheel frame 22 is positioned at one side of the annular portion 221. The second wheel frame 22 further includes an extension portion 223 extending from the inner edge of the second wheel frame 22 to the annular portion 221 in a direction perpendicular to the annular portion 221. The extension portion 223 is in the form of a cylinder. The second wheel frame 22 further includes a plurality of connection posts 224 surrounding the extension portion 223 and facing the connection posts 214 of the first wheel frame 21. The second wheel frame 22 further includes a connection portion 225 and a plurality of fixing portions 226. The connection portion 225 is positioned at one side of the annular portion 221 and extends to the annular portion 221 in a direction parallel to the extension direction of the extension portion 223. The fixing portions 226 face the fixing portions 216 of the first wheel frame 21 and can be screwed by the screwing members 3.

The rolling wheel 24 includes a middle frame 241 that is in the form of a hollow cylinder having a through-hole 242. The extension portions 213 and 223 of the first wheel frame 21 and the second wheel frame 22 may be received in the through-hole 242. The middle frame 241 further includes a limiting portion 243 to limit the position of the rolling wheel 24 when the rolling wheel 24 is rolling, thereby aligning the rolling wheel 24 in a predetermined direction in the wheel-receiving space 23. In this embodiment, the limiting portion 243 is implemented with an annular protrusion on a center section of an inner circumferential face of the rolling wheel 24. A vibration reduction pad 244 can be covered around an outer peripheral face of the middle frame 241. The vibration reduction pad 244 is made of material capable of reducing the vibration. As such, the vibration generated during the movement of the toddler walker can be reduced, improving the comfort in riding the toddler walker. In addition, the surface of the vibration reduction pad 244 may preferably have a tread pattern to increase the friction between the rolling wheel 24 and the ground, preventing the skidding of the toddler walker and increasing the safety of the toddler walker.

Each rolling member 25 includes a shaft 251 having first and second ends. A first abutting portion 252 is arranged at the first end of the shaft 251. Similarly, a second abutting portion 252 is arranged at the second end of the shaft 251. The first and second abutting portions 252 are spaced from each other by a predetermined distance and will not rotate relatively to the shaft 251. The first abutting portion 252 includes an inner end relatively close to the second abutting portion 252, as well as an outer end relatively distant to the second abutting portion 252. A coupling portion 253 is arranged at the outer end of the first abutting portion 252 and can be connected to a corresponding connection post 214. Similarly, the second abutting portion 252 also includes an inner end relatively close to the first abutting portion 252, as well as an outer end relatively distant to the first abutting portion 252. A coupling portion 253 is arranged at the outer end of the second abutting portion 252 and can be connected to a corresponding connection post 224. Therefore, the rolling members 25 are able to rotate relatively to the first wheel frame 21 and the second wheel frame 22, while the first wheel frame 21 and the second wheel frame 22 are in secure contact with the limiting portion 243 and the inner circumferential face of the rolling wheel 24.

Referring to FIG. 5, the first wheel frame 21 and the second wheel frame 22 may be coupled with each other via the connection portions 215 and 225 while the extension portions 213 and 223 face each other. When the first wheel frame 21 and the second wheel frame 22 are to be coupled together, the first wheel frame 21 and the second wheel frame 22 may jointly form the wheel-receiving space 23, the connection posts 214 and 224 of the first wheel frame 21 and the second wheel frame 22 may face each other, and the fixing portions 216 and 226 of the first wheel frame 21 and the second wheel frame 22 may face each other.

At this time, the extension portions 213 and 223 of the first wheel frame 21 and the second wheel frame 22 may be inserted into the wheel-receiving space 23, and the rolling members 25 are rotatably coupled with the connection posts 214 and 224, while the two abutting portions 252 of each rolling member 25 abut with the inner circumferential face of the rolling wheel 24. In addition, the limiting portion 243 of the middle frame 241 is limited in a position between the two abutting portions 252 of the rolling member 25. In this manner, the rolling wheel 24 is able to rotate in a consistent direction inside the wheel-receiving space 23 without making contact with the first wheel frame 21 and the second wheel frame 22 due to the diversion in direction. Advantageously, smooth rotation of the rolling wheel 24 is achieved, and abrasion of the first wheel frame 21 and the second wheel frame 22 is prevented, prolonging the service life of the toddler walker.

Also referring to FIG. 4, during the construction of the front wheel 2a, the rolling members 25 may be rotatably coupled with the connection posts 214 and 224 while abutting against the inner circumferential face of the rolling wheel 24, preventing the rolling wheel 24 from making contact with the first wheel frame 21 and the second wheel frame 22. Furthermore, during the rotation of the rolling wheel 24, the two rolling members 25 below the extension portion 213 and the other two rolling members 25 below the extension portion 223 can jointly bear the counterforce from the ground, making the rolling members 25 and the connection posts 214 and 224 more solid.

Referring to FIG. 5 again, after all of the components of the front wheel 2a are assembled, a plurality of screwing members 3 is provided to extend through the fixing portions 216 and 226, securely fixing the first wheel frame 21 and the second wheel frame 22 together. Thus, construction of the front wheel 2a is completed.

Referring to FIG. 2 again, the rear wheel 2b has substantially the same structure as the front wheel 2a and therefore is not described again in details. Moreover, the body 1 can also be separated into two opposing housings. In this regard, one of the housings can be integrally formed with the first wheel frame of the rear wheel 2b, and the other housing can be integrally formed with the second wheel frame of the rear wheel 2b, as it can be readily appreciated by one skilled in the art.

In conclusion, the wheel frames of the front wheel and the rear wheel are designed with central bores. Based on this, the rolling wheel is installed in the wheel-receiving space while the rolling members abut against the inner circumferential face of the rolling wheel, propelling the rolling wheel to rotate. In this arrangement, the front wheel and the rear wheel of the toddler walker are designed with central bores, preventing the rolling wheel from stopping rotating instantly when stuck by foreign debris during the rolling of the rolling wheel. Advantageously, collapse of the toddler walker may be better prevented, and safety of the toddler walker is improved.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A toddler walker comprising:
    a body; and
    at least one wheel coupled with and arranged under the body, wherein each of the at least one wheel comprises first and second wheel frames, wherein each of the first and second wheel frames comprises an annular portion and an inner edge forming a central hole, wherein the inner edge is positioned at one side of the annular portion, wherein each of the first and second wheel frames further comprises an extension portion extending from the inner edge to the annular portion, as well as a plurality of connection posts annularly arranged around the extension portion, wherein the extension portions of the first and second wheel frames face each other, wherein the first and second wheel frames are fastened together to jointly form a wheel-receiving space; and
    a rolling wheel and a plurality of rolling members received in the wheel-receiving space;
    wherein the rolling members are rotatably coupled with the connection posts of the first and second wheel frames and abut against an inner circumferential face of the rolling wheel;
    wherein the rolling wheel comprises a wheel frame having a through-hole, wherein the extension portions of the first and second wheel frames are received in the through-hole, wherein the wheel frame further comprises a limiting portion, wherein the rolling members rotatably abut with the limiting portion and the inner circumferential face of the rolling wheel;
    wherein the limiting portion is an annular protrusion located on a center section of the inner circumferential face of the rolling wheel, wherein each of the plurality of rolling members comprises a shaft having first and second ends, wherein a first abutting portion is arranged at the first end of the shaft, wherein a second abutting portion is arranged at the second end of the shaft, wherein the first abutting portion comprises an inner end relatively close to the second abutting portion, as well as an outer end relatively distant to the second abutting portion, wherein a coupling portion is arranged at the outer end of the first abutting portion and is connected to a corresponding one of the plurality of connection posts of the first wheel frame, wherein the second abutting portion comprises an inner end relatively close to the first abutting portion, as well as an outer end relatively distant to the first abutting portion, wherein another coupling portion is arranged at the outer end of the second abutting portion and is connected to a corresponding one of the plurality of connection posts of the second wheel frame, wherein the two coupling portions abut against the inner circumferential face of the rolling wheel, and wherein the limiting portion of the wheel frame is limited in a position between the two abutting portions; and wherein two of the plurality of connection posts of each of the first and second wheel frames are arranged below the extension portion.

2. The toddler walker as claimed in claim 1, further comprising a vibration reduction pad covered around an outer peripheral face of the middle frame.

3. The toddler walker as claimed in claim 1, wherein each of the first and second wheel frames comprises a connection portion coupled with an outer periphery of the annular portion, wherein the connection portion is positioned at one side of the annular portion and extends to the annular portion in a direction parallel to an extension direction of the extension portion, and wherein the first and second wheel frames are fastened together via the connection portions of the first and second wheel frames.

4. The toddler walker as claimed in claim 1, wherein the plurality of the connection posts except the two of the plurality of connection posts of each of the first and second wheel frames are arranged with the two of the plurality of connection posts in a same included angle around the extension portion.

\* \* \* \* \*